F. P. FENTRESS.
SUPPLEMENTARY SEAT AND CARRIER FOR MOTOR CYCLES.
APPLICATION FILED JUNE 6, 1914.
1,144,646.
Patented June 29, 1915.
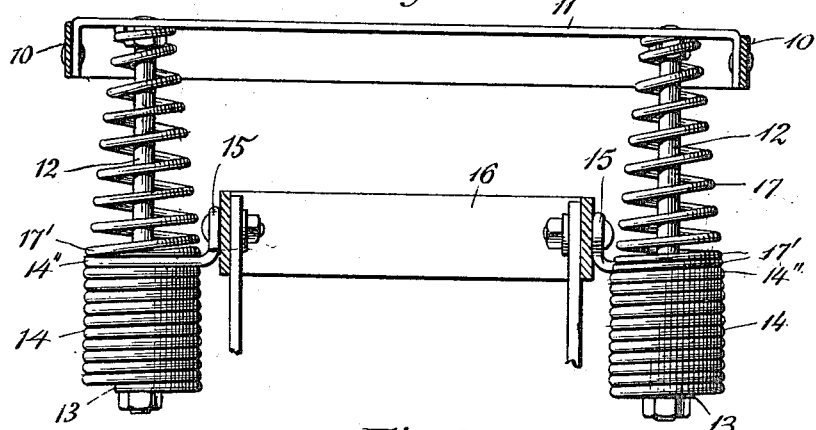
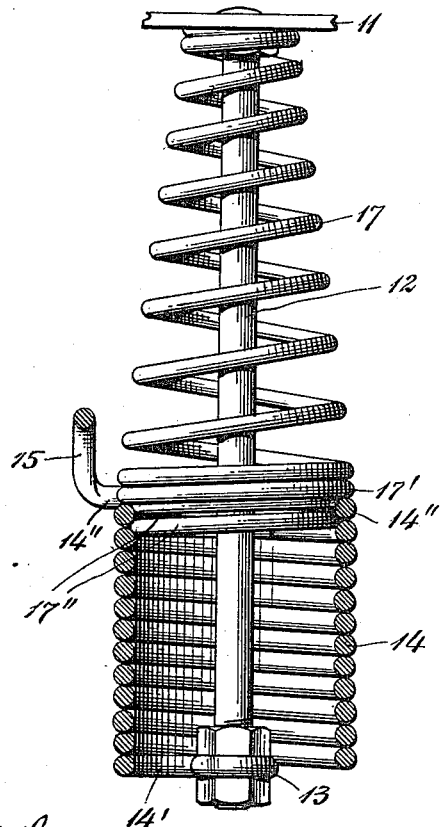
WITNESSES:
INVENTOR

UNITED STATES PATENT OFFICE.

FRANK P. FENTRESS, OF DETROIT, MICHIGAN, ASSIGNOR TO THE TROXEL MANUFACTURING COMPANY, OF ELYRIA, OHIO, A CORPORATION OF OHIO.

SUPPLEMENTARY SEAT AND CARRIER FOR MOTOR-CYCLES.

1,144,646. Specification of Letters Patent. Patented June 29, 1915.

Application filed June 6, 1914. Serial No. 843,237.

*To all whom it may concern:*

Be it known that I, FRANK P. FENTRESS, a citizen of the United States, residing at Detroit, in the county of Wayne and State of Michigan, have invented certain new and useful Improvements in Supplementary Seats and Carriers for Motor-Cycles, of which the following is a specification.

This invention relates to supplementary seats and carriers for motorcycles, and more especially to that class thereof for which U. S. Letters Patent were issued to me on July 19, 1910, numbered 965,093, to which reference may be had, and it has for one of its objects the provision of an improved spring support for the supplementary frame or seat, said support comprising a primary spring and a secondary spring, the latter being carried by the primary spring and interposed between it and the seat frame.

The invention has, furthermore, for its object the provision of a compound spring of this character, the components of which are interlocked with each other so as to prevent separation between them at their line of junction.

Further objects of the invention will hereinafter appear and be particularly defined in the claims.

The invention has been clearly illustrated in the accompanying drawings in which similar characters denote similar parts, and in which—

Figure 1 is a transverse section of a seat, the supporting frame, and springs interposed between the frame and the seat and embodying my present invention. Fig. 2 illustrates the assembly of one compound spring, the lower spring being shown in section.

The seat or carrier may be of any desired construction and preferably comprises a strip of metal 10 shaped or bent as illustrated in the Letters Patent above referred to. The strip 10 is braced by means of one or more transverse strips 11, the one illustrated being disposed near the rear end of the seat and having a pair of spaced thrust rods 12 rigidly secured thereto. The lower end of each thrust rod is securely tied to an eye 13 formed on the lowermost convolution 14′ of a primary spring 14, the several convolutions of which are herein shown as forming a cylinder, but it should be understood that this form may be varied as desired.

The uppermost convolution 14″ has a side extension bent to form a loop or eye 15 secured to a supporting frame 16 (see Fig. 1) of any desired form. The parts thus far described may correspond substantially to those shown in the Letters Patent above referred to, while the new feature of the present invention resides particularly in the provision of a secondary spring 17 preferably of the cone type and normally in distended condition, while the primary spring 14 is normally in its contracted or closed condition. This secondary spring 17 is interposed between the primary spring 14 and the underside of the seat 11, its lower convolutions being so arranged that one convolution, as for instance 17′, will rest upon the uppermost convolution 14″ of the primary spring. From this it follows that when a load is placed upon the seat 11, the primary spring will be expanded or stretched, while the secondary spring 17 will be compressed, so that in this manner the action of both springs becomes effective in supporting the seat. It will be observed that, inasmuch as the upper spring is supported upon the upper convolution of the lower spring which in this instance is directly secured to the supporting frame, (in contradistinction to a construction in which said secondary spring may be supported by the lowermost convolution of the primary spring), either spring is adapted for resiliently supporting the seat, even if the other should become broken, that is: provided that the attaching loop 15 should still perform its function either in supporting the upper end of the primary spring or acting as a thrust member or seat for the secondary or upper spring 17. It will also be understood that if both springs are in proper condition and arrangement, said springs will act conjointly.

Means are provided whereby the lower end of the upper or secondary spring 17 is maintained in proper position on the primary spring, and for this reason I deem it expedient to make at least one or two of the lowermost convolutions 17″ of the secondary spring small enough to permit them to enter into the open top of the primary spring. Furthermore, in order to hold the lower end of the secondary spring against separation from the primary spring, the diameter of the lowermost convolutions 17″ is preferably such that these convolutions may be screwed into the primary spring in the manner shown in Fig. 2. Inasmuch as the upper spring is formed of wire preferably of a smaller gage than that of the primary spring, and it being furthermore supposed that the lowermost convolutions 17″ are close-wound, the screwing-in action will result in slightly drawing said lower convolutions apart under spring tension so that therefore these connecting convolutions will frictionally engage the primary spring and thus lessen the liability of separation between these two members.

Particular attention is invited to the fact that by my present construction one single attaching loop or eye only is used for supporting both springs for independent or for joint action.

Changes may be made in the manner of assembling or holding said springs together, and also in the formation or shape of said springs, without departing from the spirit of the invention.

I claim:—

1. The combination with a seat, and a supporting frame therefor, of a primary spring having its opposite ends connected with the seat and said frame respectively, and a secondary spring interposed between said seat and the primary spring and supported by the latter.

2. The combination with a seat, and a supporting frame therefor, of a primary spring having its opposite ends connected with the seat and said frame respectively, and a secondary spring seated on and supported by said primary spring and supporting said seat.

3. The combination with a seat, and a supporting frame therefor, of a primary spring having its upper end secured to said frame and having its lower end connected to said seat, and a secondary spring resting with its lower end against the uppermost convolution of the primary spring, and having its upper end arranged to support said seat.

4. The combination with a seat, and a supporting frame therefor, of a primary spring having its upper end secured to said frame and having its lower end connected to said seat, and a secondary spring having its lowermost convolution screw-threaded into the convolutions of the primary spring, and having its upper end adapted to support said seat.

5. The combination with a seat, and a supporting frame therefor, of a helical spring having its upper end attached to said frame, a thrust rod secured to said seat and attached to the lower end of said primary spring, and a secondary helical spring having its lower convolutions in threaded engagement with the upper convolutions of the primary spring and having one of its convolutions seated upon the uppermost convolution of the latter, and having its upper end resting against the underside of said seat.

In testimony whereof I affix my signature in presence of two witnesses.

FRANK P. FENTRESS.

Witnesses:
H. D. MacDonald,
M. E. Heenan.

Copies of this patent may be obtained for five cents each, by addressing the "Commissioner of Patents, Washington, D. C."